(12) United States Patent
Black et al.

(10) Patent No.: US 9,195,697 B2
(45) Date of Patent: Nov. 24, 2015

(54) CORRELATION OF WRITTEN NOTES TO DIGITAL CONTENT

(71) Applicant: Livescribe Inc., Oakland, CA (US)

(72) Inventors: David Robert Black, Sunnyvale, CA (US); Brett Reed Halle, Pleasanton, CA (US); Andrew J. Van Schaack, Nashville, TN (US)

(73) Assignee: Livescribe Inc., Oakland, CA (US)

( * ) Notice: Subject to any disclaimer, the term of this patent is extended or adjusted under 35 U.S.C. 154(b) by 210 days.

(21) Appl. No.: 14/062,556

(22) Filed: Oct. 24, 2013

(65) Prior Publication Data
US 2014/0122490 A1 May 1, 2014

Related U.S. Application Data (60) Provisional application No. 61/719,290, filed on Oct. 26, 2012.

(51) Int. Cl.
| | | |
|---|---|---|
| *G06F 17/30* | (2006.01) | |
| *G06F 3/038* | (2013.01) | |
| *G06F 3/0354* | (2013.01) | |
| *G06F 3/03* | (2006.01) | |

(52) U.S. Cl.
CPC .......... *G06F 17/30321* (2013.01); *G06F 3/038* (2013.01); *G06F 3/03545* (2013.01); *G06F 3/0317* (2013.01)

(58) Field of Classification Search
CPC . G06F 17/30321; G06F 3/038; G06F 3/0317; G06F 3/03545
USPC ......... 707/611, 620, 621, 634, 635, 637, 640, 707/737, 740, 912, 916, 917; 382/181, 187, 382/188, 313, 314; 345/156, 158, 179, 180, 345/213, 633; 341/1; 358/1.5
See application file for complete search history.

(56) References Cited

U.S. PATENT DOCUMENTS

| | | | |
|---|---|---|---|
| 5,535,063 A | 7/1996 | Lamming | |
| 8,284,951 B2 * | 10/2012 | Van Schaack et al. | 381/91 |
| 2002/0149605 A1 | 10/2002 | Grossman | |
| 2005/0110778 A1 * | 5/2005 | Ben Ayed | 345/179 |
| 2007/0126755 A1 * | 6/2007 | Zhang et al. | 345/619 |
| 2008/0184121 A1 | 7/2008 | Kulas | |
| 2009/0024988 A1 * | 1/2009 | Edgecomb et al. | 717/168 |
| 2009/0063492 A1 | 3/2009 | Meyyappan et al. | |

(Continued)

OTHER PUBLICATIONS

Basu et al., A Novel Scheme for Retrieval of Handwritten Textual Annotations for Information Just in Time (iJIT), TENCON 2008—2008 IEEE Region 10 Conference Year: 2008, pp. 1-6, DOI: 10.1109/TENCON.2008.4766776.*

(Continued)

*Primary Examiner* — Greta Robinson
(74) *Attorney, Agent, or Firm* — Fenwick & West LLP (57) ABSTRACT

A system and method receives a plurality of data streams from a smart pen device and a computing device, and indexes the data streams to a synchronized time index. A processor receives a first data stream representing gesture data captured by a smart pen device, and a second data stream representing a sequence of states associated with applications executing on a computing device, such that each state identifies content displayed by a computing device while the gesture data is captured. For example, a state could be a particular page of a digital document displayed by the computing device. After receiving the first and second data streams, the processor indexes the data streams to a synchronized time index, and stores the indexed data streams in a memory.

21 Claims, 5 Drawing Sheets

(56) References Cited

U.S. PATENT DOCUMENTS

2009/0251336 A1 10/2009 Marggraff et al.
2011/0078151 A1* 3/2011 Bilbrey .................. 707/746

OTHER PUBLICATIONS

Hinckley et al., "Stitching: Pen Gestures That Span Multiple Displays," Proceeding AVI '04 Proceedings of the Working Conference on Advanced Visual Interfaces, May 25-28, 2004, pp. 23-31, [Online] [Retrieved on Apr. 6, 2014] Retrieved from the Internet<URL:http://dl.acm.org/citation.cfm?id=989866>.

PCT International Search Report and Written Opinion, PCT Application No. PCT/US13/66643, May 27, 2014, 11 pages.

* cited by examiner

CORRELATION OF WRITTEN NOTES TO DIGITAL CONTENT

CROSS-REFERENCE TO RELATED APPLICATIONS

This application claims the benefit of U.S. Provisional Application No. 61/719,290, filed Oct. 26, 2012, the disclosure of which is incorporated herein by reference.

BACKGROUND

This invention relates generally to pen-based computing systems, and more particularly to synchronizing recorded writing, audio, and digital content in a smart pen environment.

A smart pen is an electronic device that digitally captures writing gestures of a user and converts the captured gestures to digital information that can be utilized in a variety of applications. For example, in an optics-based smart pen, the smart pen includes an optical sensor that detects and records coordinates of the pen while writing with respect to a digitally encoded surface (e.g., a dot pattern). Additionally, some traditional smart pens include an embedded microphone that enable the smart pen to capture audio synchronously with capturing the writing gestures. The synchronized audio and gesture data can then be replayed. Smart pens can therefore provide an enriched note taking experience for users by providing both the convenience of operating in the paper domain and the functionality and flexibility associated with digital environments.

SUMMARY

Embodiments of the invention provide a system and method for receiving a plurality of data streams from a smart pen device and computing device, and indexing the data streams to a synchronized time index. A processor receives a first data stream representing gesture data captured by a smart pen device, and a second data stream representing a sequence of states associated with applications executing on a computing device. Each state identifies content displayed by a computing device while the gesture data is captured. A state could be, for example, a particular page of a digital document displayed by the computing device at a given time, a particular zoomed in portion of a page of a digital document displayed at a given time, user inputs stored by the computing device at a given time, or a playback frame of a video played by the computing device at a given time.

After receiving the first and second data streams, the processor then indexes the data streams to a synchronized time index, and stores the indexed data streams to a memory. In an embodiment, the processor also receives a third data stream representing audio data captured by an audio capture system, and indexes and stores the third data stream. In an embodiment, the stored indexed data streams are retrieved upon a user's request for playback, and a portion of the retrieved data streams is replayed by displaying the gesture data or sequence of states in correlation with the synchronized time index. In another embodiment, a portion of the first data stream is associated with a portion of a digital document.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview of a Pen-Based Computing Environment

Figure 1:
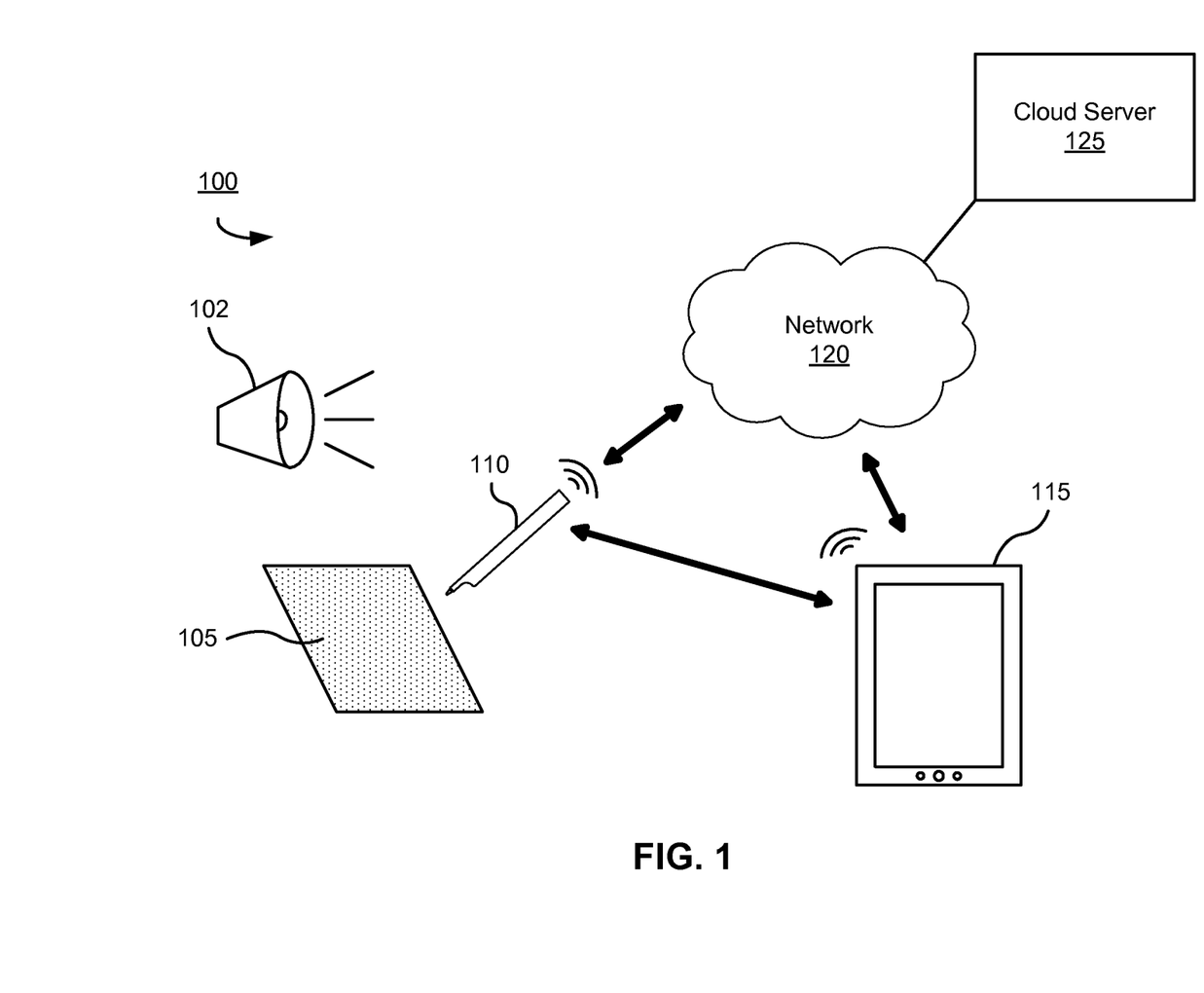
FIG. 1 is a schematic diagram of an embodiment of a smart pen-based computing environment.

FIG. 1 illustrates an embodiment of a pen-based computing environment 100. The pen-based computing environment comprises an audio source 102, a writing surface 105, a smart pen 110, a computing device 115, a network 120, and a cloud server 125. In alternative embodiments, different or additional devices may be present such as, for example, additional smart pens 110, writing surfaces 105, and computing devices 115 (or one or more device may be absent).

The smart pen 110 is an electronic device that digitally captures interactions with the writing surface 105 (e.g., writing gestures and/or control inputs) and concurrently captures audio from an audio source 102. The smart pen 110 is communicatively coupled to the computing device 115 either directly or via the network 120. The captured writing gestures, control inputs, and/or audio may be transferred from the smart pen 110 to the computing device 115 (e.g., either in real-time or at a later time) for use with one or more applications executing on the computing device 115. Furthermore, digital data and/or control inputs may be communicated from the computing device 115 to the smart pen 110 (either in real-time or an offline process) for use with an application executing on the smart pen 110. The cloud server 125 provides remote storage and/or application services that can be utilized by the smart pen 110 and/or the computing device 115. The computing environment 100 thus enables a wide variety of applications that combine user interactions in both paper and digital domains.

In one embodiment, the smart pen 110 comprises a pen (e.g., an ink-based ball point pen, a stylus device without ink, a stylus device that leaves "digital ink" on a display, a felt marker, a pencil, or other writing apparatus) with embedded computing components and various input/output functionalities. A user may write with the smart pen 110 on the writing surface 105 as the user would with a conventional pen. During the operation, the smart pen 110 digitally captures the writing gestures made on the writing surface 105 and stores electronic representations of the writing gestures. The captured writing gestures have both spatial components and a time component. For example, in one embodiment, the smart pen 110 captures position samples (e.g., coordinate information) of the smart pen 110 with respect to the writing surface 105 at various sample times and stores the captured position information together with the timing information of each sample. The captured writing gestures may furthermore include identifying information associated with the particular writing surface 105 such as, for example, identifying information of a particular page in a particular notebook so as to distinguish between data captured with different writing surfaces 105. In one embodiment, the smart pen 110 also captures other attributes of the writing gestures chosen by the user. For example, ink color may be selected by pressing a physical key on the smart pen 110, tapping a printed icon on the writing surface, selecting an icon on a computer display, etc. This ink information (color, line width, line style, etc.) may also be encoded in the captured data.

The smart pen 110 may additionally capture audio from the audio source 102 (e.g., ambient audio) concurrently with capturing the writing gestures. The smart pen 110 stores the captured audio data in synchronization with the captured writing gestures (i.e., the relative timing between the captured gestures and captured audio is preserved). Furthermore, the smart pen 110 may additionally capture digital content from the computing device 115 concurrently with capturing writing gestures and/or audio. The digital content may include, for example, user interactions with the computing device 115 or synchronization information (e.g., cue points) associated with time-based content (e.g., a video) being viewed on the computing device 115. The smart pen 110 stores the digital content synchronized in time with the captured writing gestures and/or the captured audio data (i.e., the relative timing information between the captured gestures, audio, and the digital content is preserved).

Synchronization may be assured in a variety of different ways. For example, in one embodiment a universal clock is used for synchronization between different devices. In another embodiment, local device-to-device synchronization may be performed between two or more devices. In another embodiment, external content can be combined with the initially captured data and synchronized to the content captured during a particular session.

In an alternative embodiment, the audio and/or digital content 115 may instead be captured by the computing device 115 instead of, or in addition to, being captured by the smart pen 110. Synchronization of the captured writing gestures, audio data, and/or digital data may be performed by the smart pen 110, the computing device 115, a remote server (e.g., the cloud server 125) or by a combination of devices. Furthermore, in an alternative embodiment, capturing of the writing gestures may be performed by the writing surface 105 instead of by the smart pen 110.

In one embodiment, the smart pen 110 is capable of outputting visual and/or audio information. The smart pen 110 may furthermore execute one or more software applications that control various outputs and operations of the smart pen 110 in response to different inputs.

In one embodiment, the smart pen 110 can furthermore detect text or other pre-printed content on the writing surface 105. For example, the smart pen 110 can tap on a particular word or image on the writing surface 105, and the smart pen 110 could then take some action in response to recognizing the content such as playing a sound or performing some other function. For example, the smart pen 110 could translate a word on the page by either displaying the translation on a screen or playing an audio recording of it (e.g., translating a Chinese character to an English word).

In one embodiment, the writing surface 105 comprises a sheet of paper (or any other suitable material that can be written upon) and is encoded with a pattern (e.g., a dot pattern) that can be read by the smart pen 110. The pattern is sufficiently unique to enable to smart pen 110 to determine its relative positioning (e.g., relative or absolute) with respect to the writing surface 105. In another embodiment, the writing surface 105 comprises electronic paper, or e-paper, or may comprise a display screen of an electronic device (e.g., a tablet). In these embodiments, the sensing may be performed entirely by the writing surface 105 or in conjunction with the smart pen 110. Movement of the smart pen 110 may be sensed, for example, via optical sensing of the smart pen device, via motion sensing of the smart pen device, via touch sensing of the writing surface 105, via acoustic sensing, via a fiducial marking, or other suitable means.

The network 120 enables communication between the smart pen 110, the computing device 115, and the cloud server 125. The network 120 enables the smart pen 110 to, for example, transfer captured digital content between the smart pen 110, the computing device 115, and/or the cloud server 125, communicate control signals between the smart pen 110, the computing device 115, and/or cloud server 125, and/or communicate various other data signals between the smart pen 110, the computing device 115, and/or cloud server 125 to enable various applications. The network 120 may include wireless communication protocols such as, for example, Bluetooth, Wifi, cellular networks, infrared communication, acoustic communication, or custom protocols, and/or may include wired communication protocols such as USB or Ethernet. Alternatively, or in addition, the smart pen 110 and computing device 115 may communicate directly via a wired or wireless connection without requiring the network 120.

The computing device 115 may comprise, for example, a tablet computing device, a mobile phone, a laptop or desktop computer, or other electronic device (e.g., another smart pen 110). The computing device 115 may execute one or more applications that can be used in conjunction with the smart pen 110. For example, content captured by the smart pen 110 may be transferred to the computing system 115 for storage, playback, editing, and/or further processing. Additionally, data and or control signals available on the computing device 115 may be transferred to the smart pen 110. Furthermore, applications executing concurrently on the smart pen 110 and the computing device 115 may enable a variety of different real-time interactions between the smart pen 110 and the computing device 115. For example, interactions between the smart pen 110 and the writing surface 105 may be used to provide input to an application executing on the computing device 115 (or vice versa).

In order to enable communication between the smart pen 110 and the computing device 115, the smart pen 110 and the computing device may establish a "pairing" with each other. The pairing allows the devices to recognize each other and to authorize data transfer between the two devices. Once paired, data and/or control signals may be transmitted between the smart pen 110 and the computing device 115 through wired or wireless means.

In one embodiment, both the smart pen 110 and the computing device 115 carry a TCP/IP network stack linked to their respective network adapters. The devices 110, 115 thus support communication using direct (TCP) and broadcast (UDP) sockets with applications executing on each of the smart pen 110 and the computing device 115 able to use these sockets to communicate.

Cloud server 125 comprises a remote computing system coupled to the smart pen 110 and/or the computing device 115 via the network 120. For example, in one embodiment, the cloud server 125 provides remote storage for data captured by the smart pen 110 and/or the computing device 115. Furthermore, data stored on the cloud server 125 can be accessed and used by the smart pen 110 and/or the computing device 115 in the context of various applications.

Smart Pen System Overview

Figure 2:
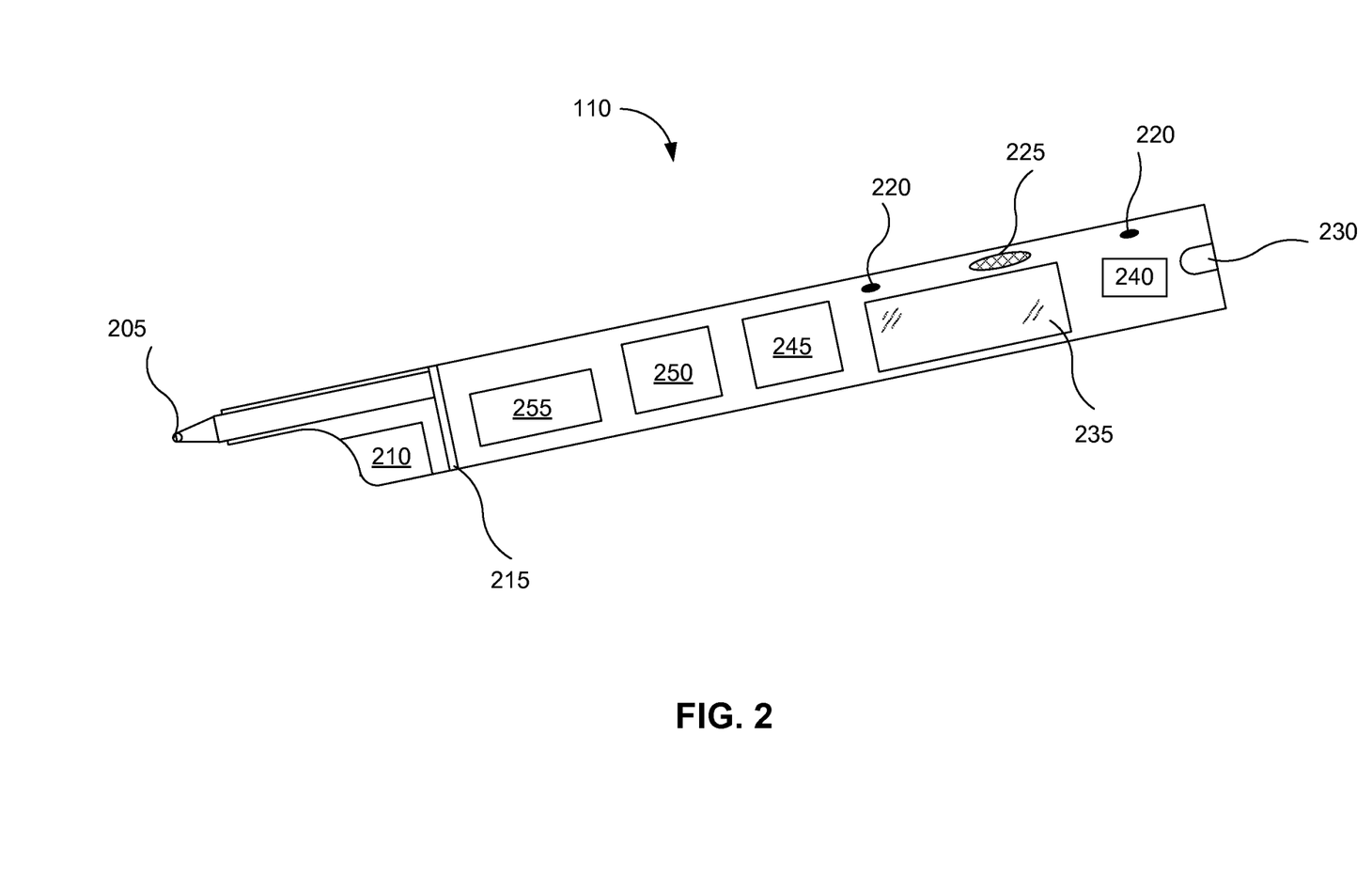
FIG. 2 is a diagram of an embodiment of a smart pen device for use in a pen-based computing system.

FIG. 2 illustrates an embodiment of the smart pen 110. In the illustrated embodiment, the smart pen 110 comprises a marker 205, an imaging system 210, a pen down sensor 215, one or more microphones 220, a speaker 225, an audio jack 230, a display 235, an I/O port 240, a processor 245, an onboard memory 250, and a battery 255. The smart pen 110 may also include buttons, such as a power button or an audio recording button, and/or status indicator lights. In alternative embodiments, the smart pen 110 may have fewer, additional, or different components than those illustrated in FIG. 2.

The marker 205 comprises any suitable marking mechanism, including any ink-based or graphite-based marking devices or any other devices that can be used for writing. The marker 205 is coupled to a pen down sensor 215, such as a pressure sensitive element. The pen down sensor 215 produces an output when the marker 205 is pressed against a surface, thereby detecting when the smart pen 110 is being used to write on a surface or to interact with controls or buttons (e.g., tapping) on the writing surface 105. In an alternative embodiment, a different type of "marking" sensor may be used to determine when the pen is making marks or interacting with the writing surface 110. For example, a pen up sensor may be used to determine when the smart pen 110 is not interacting with the writing surface 105. Alternative, the smart pen 110 may determine when the pattern on the writing surface 105 is in focus (based on, for example, a fast Fourier transform of a captured image), and accordingly determine when the smart pen is within range of the writing surface 105. In another alternative embodiment, the smart pen 110 can detect vibrations indicating when the pen is writing or interacting with controls on the writing surface 105.

The imaging system 210 comprises sufficient optics and sensors for imaging an area of a surface near the marker 205. The imaging system 210 may be used to capture handwriting and gestures made with the smart pen 110. For example, the imaging system 210 may include an infrared light source that illuminates a writing surface 105 in the general vicinity of the marker 205, where the writing surface 105 includes an encoded pattern. By processing the image of the encoded pattern, the smart pen 110 can determine where the marker 205 is in relation to the writing surface 105. An imaging array of the imaging system 210 then images the surface near the marker 205 and captures a portion of a coded pattern in its field of view.

In other embodiments of the smart pen 110, an appropriate alternative mechanism for capturing writing gestures may be used. For example, in one embodiment, position on the page is determined by using pre-printed marks, such as words or portions of a photo or other image. By correlating the detected marks to a digital version of the document, position of the smart pen 110 can be determined. For example, in one embodiment, the smart pen's position with respect to a printed newspaper can be determined by comparing the images captured by the imaging system 210 of the smart pen 110 with a cloud-based digital version of the newspaper. In this embodiment, the encoded pattern on the writing surface 105 is not necessarily needed because other content on the page can be used as reference points.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 105. This can be used to, for example, recognize handwriting or printed text, images, or controls on the writing surface 105. The imaging system 210 may further be used in combination with the pen down sensor 215 to determine when the marker 205 is touching the writing surface 105. For example, the smart pen 110 may sense when the user taps the marker 205 on a particular location of the writing surface 105.

The smart pen 110 furthermore comprises one or more microphones 220 for capturing audio. In an embodiment, the one or more microphones 220 are coupled to signal processing software executed by the processor 245, or by a signal processor (not shown), which removes noise created as the marker 205 moves across a writing surface and/or noise created as the smart pen 110 touches down to or lifts away from the writing surface. As explained above, the captured audio data may be stored in a manner that preserves the relative timing between the audio data and captured gestures.

The input/output (I/O) device 240 allows communication between the smart pen 110 and the network 120 and/or the computing device 115. The I/O device 240 may include a wired and/or a wireless communication interface such as, for example, a Bluetooth, Wi-Fi, infrared, or ultrasonic interface.

The speaker 225, audio jack 230, and display 235 are output devices that provide outputs to the user of the smart pen 110 for presentation of data. The audio jack 230 may be coupled to earphones so that a user may listen to the audio output without disturbing those around the user, unlike with a speaker 225. In one embodiment, the audio jack 230 can also serve as a microphone jack in the case of a binaural headset in which each earpiece includes both a speaker and microphone. The use of a binaural headset enables capture of more realistic audio because the microphones are positioned near the user's ears, thus capturing audio as the user would hear it in a room.

The display 235 may comprise any suitable display system for providing visual feedback, such as an organic light emitting diode (OLED) display, allowing the smart pen 110 to provide a visual output. In use, the smart pen 110 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 110, and the display 235 may display word phrases, static or dynamic images, or prompts as directed by such an application. In addition, the speaker 225 and audio jack 230 may also be used to play back audio data that has been recorded using the microphones 220. The smart pen 110 may also provide haptic feedback to the user. Haptic feedback could include, for example, a simple vibration notification, or more sophisticated motions of the smart pen 110 that provide the feeling of interacting with a virtual button or other printed/displayed controls. For example, tapping on a printed button could produce a "click" sound and the feeling that a button was pressed.

A processor 245, onboard memory 250 (e.g., a non-transitory computer-readable storage medium), and battery 255 (or any other suitable power source) enable computing functionalities to be performed at least in part on the smart pen 110. The processor 245 is coupled to the input and output devices and other components described above, thereby enabling applications running on the smart pen 110 to use those components. As a result, executable applications can be stored to a non-transitory computer-readable storage medium of the onboard memory 250 and executed by the processor 245 to carry out the various functions attributed to the smart pen 110 that are described herein. The memory 250 may furthermore store the recorded audio, handwriting, and digital content, either indefinitely or until offloaded from the smart pen 110 to a computing system 115 or cloud server 125.

In an embodiment, the processor 245 and onboard memory 250 include one or more executable applications supporting and enabling a menu structure and navigation through a file system or application menu, allowing launch of an application or of a functionality of an application. For example, navigation between menu items comprises an interaction between the user and the smart pen 110 involving spoken and/or written commands and/or gestures by the user and audio and/or visual feedback from the smart pen computing system. In an embodiment, pen commands can be activated using a "launch line." For example, on dot paper, the user draws a horizontal line from right to left and then back over the first segment, at which time the pen prompts the user for a command. The user then prints (e.g., using block characters) above the line the desired command or menu to be accessed (e.g., Wi-Fi Settings, Playback Recording, etc.). Using integrated character recognition (ICR), the pen can convert the written gestures into text for command or data input. In alternative embodiments, a different type of gesture can be recognized to enable the launch line. Hence, the smart pen 110 may receive input to navigate the menu structure from a variety of modalities.

Synchronization of Written, Audio and Digital Data Streams

Figure 3:
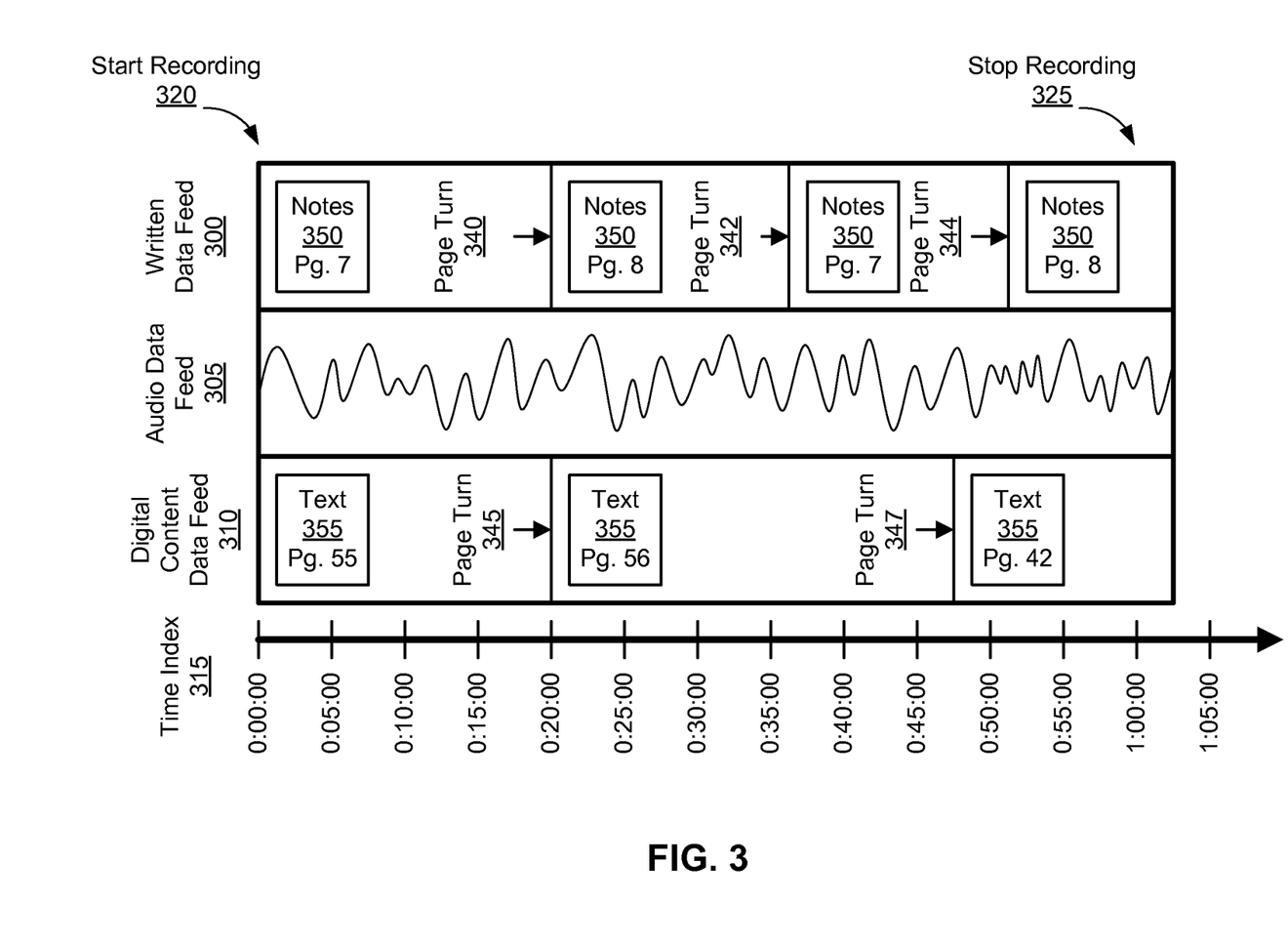
FIG. 3 is a timeline diagram demonstrating an example of synchronized written, audio, and digital content data feeds captured by an embodiment of a smart pen device.

During operation, the smart pen 110 acquires collections of contents that come in two primary forms, those generated elsewhere and viewed within the context of the system, and those generated or inputted by the user. Both forms generally carry some form of indexing or relativity, such that the elements of the data contents have some relationship to each other. FIG. 3 illustrates an example of various data feeds that are present (and optionally stored) during operation of the smart pen 110 in the smart pen environment 100. For example, in one embodiment, a written data feed 300, an audio data feed 305, and a digital content data feed 315 are all synchronized to a common time index 315.

The written data feed 300 represents, for example, a sequence of digital samples encoding spatial coordinate information (e.g., "X" and "Y" coordinates) of the smart pen's position with respect to a particular writing surface 105 (e.g., dot paper or digital surface) and temporal coordinates (e.g., time values from time index 315 indicating when the smart pen 110 was positioned at a particular spatial position). Combined, the spatial and time coordinates comprise the gesture data (or "stroke" data) recorded as part of the written data feed 300. Additionally, in one embodiment, the coordinate information can include pen angle, pen rotation, pen velocity, pen acceleration, or other positional, angular, or motion characteristics of the smart pen 110. The writing surface 105 may change over time and therefore identifying information for the writing surface is also captured (e.g., surface type, page number, notebook ID, digital file reference and so forth). For example, the user changes pages of a notebook or switches notebooks. Alternatively, the user may change to a stylus mode of the smart pen 110 in which no ink is deposited and in which the user can write directly on a digital display surface (e.g., a tablet). The written data feed 300 may also include other information captured by the smart pen 110 that identifies whether or not the user is writing or hovering the cursor above the writing surface 105 (e.g., pen up/pen down sensor information) or identifies other types of interactions with the smart pen 110.

Once gesture data is captured in the written data feed 300, data can later be queried based on either the temporal or spatial coordinates within the written data feed 300. Once data in the written data feed 300 is correlated with other data feeds, gesture data can also be queried based on the indices or coordinates in any of the data feeds, including temporal, spatial (e.g., gesture positioning), or otherwise (e.g., page numbers). For example, querying the data with a particular time location in the time index 315 will return the gesture data that was captured beginning at the queried time. Furthermore, the spatial coordinates can be queried (e.g., by tapping on a particular location on the page) and the time location associated with that spatial location in the written data feed 300 can be returned. The time location can then be used as an index to retrieve data from other data feeds as will be described below.

The audio data feed 305 represents, for example, a sequence of digital audio samples captured at particular sample times. In some embodiments, the audio data feed 305 may include multiple audio signals (e.g., stereo audio data). Before recording captured audio samples, smart pen 110 may process the audio samples through filters to reduce the background noise (e.g., pen writing scratches, air hisses, and background buzzes). The audio data feed 305 is also linked to time index 315 for later referencing and playback.

The digital content data feed 310 represents, for example, a sequence of states associated with one or more applications executing on the computing device 115. For example, the digital content data feed 310 may comprise a sequence of digital samples that each represents the state of the computing device 115 at particular sample times. The state information could represent, for example, a particular page of a digital document being displayed by the computing device 115 at a given time. Furthermore, the state information could include a particular zoomed in portion of a page being viewed. In another embodiment, the state information represents a current playback frame of a video being played by the computing device 115, a set of inputs being stored by the computing device 115 at a given time, etc. The state of the computing device 115 may change over time based on user interactions with the computing device 115. For example, when the user changes pages of a digital document, this state change is recorded in the digital content data feed 310. In other scenarios, the state of the computing device 115 may change in response to commands or inputs from the written data feed 300 (e.g., gesture commands) or audio data feed 305 (e.g., voice commands). For example, the written data feed 300 may cause real-time updates to the state of the computing device 115. In one mode, the computing device 115 may display the written data feed 300 in real-time as it is captured. In another example, a display of the computing device 115 may change based on an input represented by the captured gestures of the written data feed 300. The user may make a gesture with the smart pen 110 that causes the computing device 115 to change pages of a digital document being viewed.

By establishing temporal coordinates to the data in the digital content data feed 310, "viewing sessions" may also be established that replicate the references displayed on the computing device 115 during the note-taking session. The data in the digital content data feed 310 may also be associated directly with the digital documents so that when the digital documents are opened, the "viewing "sessions" can be replayed. Once digital content is captured in the digital content data feed 310, data can later be queried based on either the time index or the digital content. For example, querying the data with a particular time location in the time index 315 will return the digital content that was recorded (e.g., a particular page of a digital document being viewed) at the queried time. Furthermore, the data can be queried with a particular portion of the digital content (e.g., by turning to a particular page of a digital document) and the time location associated with portion of the digital document in the digital content data feed 310 can be returned. The time location can then be used as an index to retrieve data from other data feeds (e.g., the written data feed 300 and/or the audio data feed 305).

The specific example illustrated in FIG. 3 represents a use of the smart pen computing system in, for example, a classroom setting. When the user starts 320 a recording session at 0:00:00, the three data feeds 300, 305, 310 begin recording data. These three feeds are all correlated to time index 315. The user begins writing notes on page 7 of a notepad 350 while concurrently viewing page 55 of a digital textbook 355 on the computing device 115. At a time 00:20:00 the user turns 345 to page 56 of the digital textbook 355 and also turns 350 to page 8 of the notepad 350. At about 00:36:00, the user turns back to p. 7 of the notepad 350 and the smart pen 110 captures additional notes on this page correlated to the time index 315. At approximately 00:47:00, the user turns to page 42 of the digital textbook 355 while continuing to take notes on p. 7 of the notepad 350. At approximately 00:51:00, the user changes back to p. 8 of the notepad 350 and takes additional note. The user then stops 325 the recording. Following the session, the user can then query and retrieve correlated portions of the written data, audio, and portions of the digital document 355.

In one alternative operation mode, the user can select to take "virtual notes" on a page of the digital textbook 355. In this mode, the user writes on the writing surface 105 (e.g., the notepad 350) and the written data feed 300 is transferred to the computing device 115 in real-time. The writing gestures are then superimposed on a page of the digital textbook 355 in real-time as if the user is writing on digital textbook 355. This gesture data may also be linked directly to the page of the digital textbook 355 so that it is available when the textbook is later viewed.

While FIG. 3 provides one representative example, other embodiments may include fewer or additional data feeds (including data feeds of different types), other types of references, or other spans of time than those illustrated.

While the time index 315 provides one reference point for capturing associations between the gesture data, audio data, and/or digital content, other non-temporal associations can also be established. For example, a user can manually select to associate a particular set of written gesture data or a particular portion of an audio clip to a selected page of a digital document even if they were not synchronized to the same time index during the initial capture. These relationships are also stored for later use. Once relationships have been established, data from the various data feed 300, 305, 310 can be stored in various formats for convenience of later access. For example, in one embodiment data from each of the written data feed 300, audio data feed 305, and digital content data feed 310 may be formatted and stored in a metadata file that is associated with a digital document (or embedded directly into the digital documents). Using FIG. 3 as an example, the gesture data recorded in the written data feed 300, the timing of individual page views of the digital textbook 355 (represented by the digital content data feed 310, and a reference to the audio file storing the audio data feed 305 may all be stored in a metadata file associated with the digital textbook 355. Furthermore, in one embodiment, the unmodified content from the individual feeds may still be separately stored for use by various applications.

Content Acquisition and Review in a Smart Pen-Based System

Figure 4:
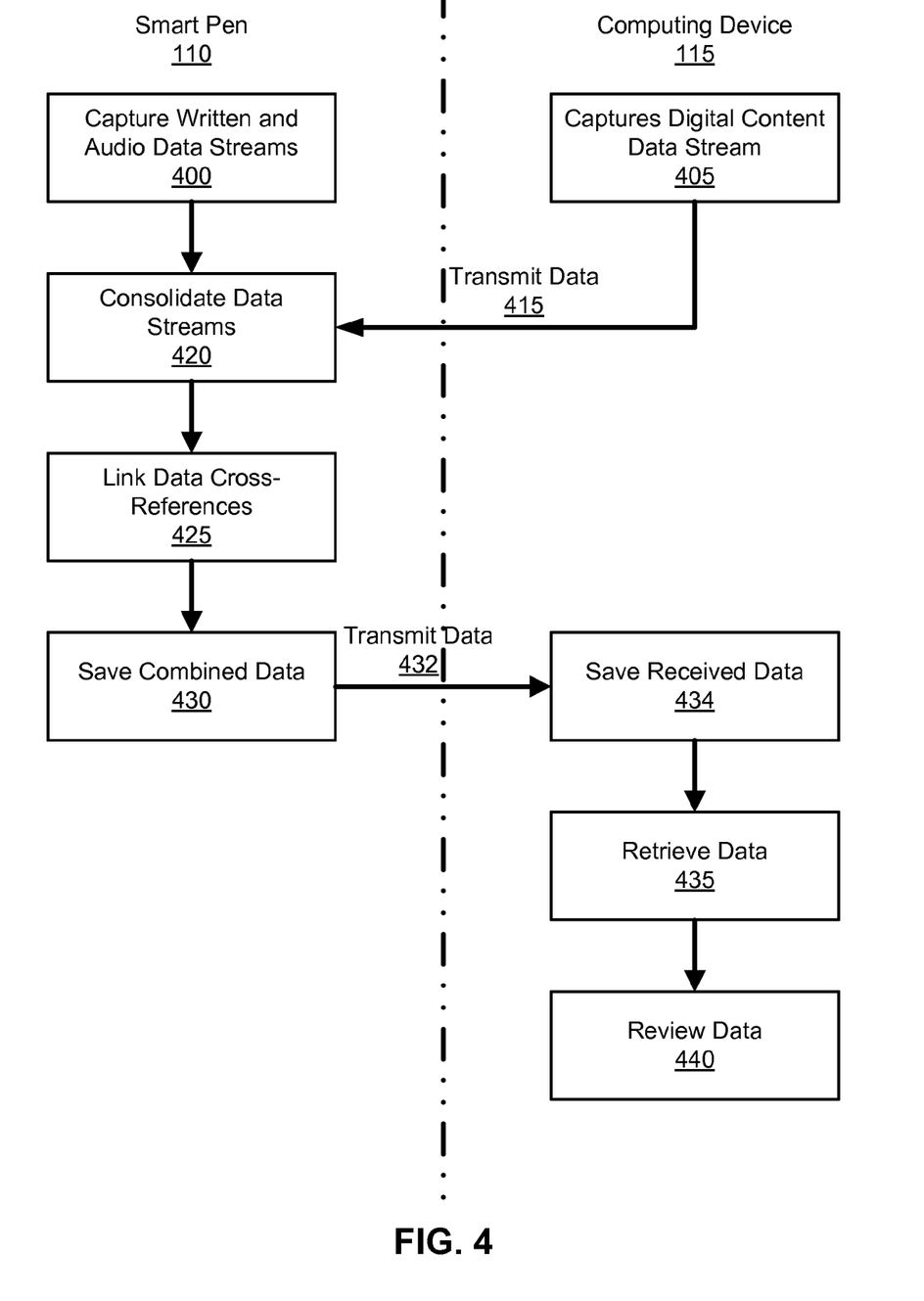
FIG. 4 is flow diagram of an embodiment of content data acquisition and review in a smart pen-based computing system.
Figure 5:
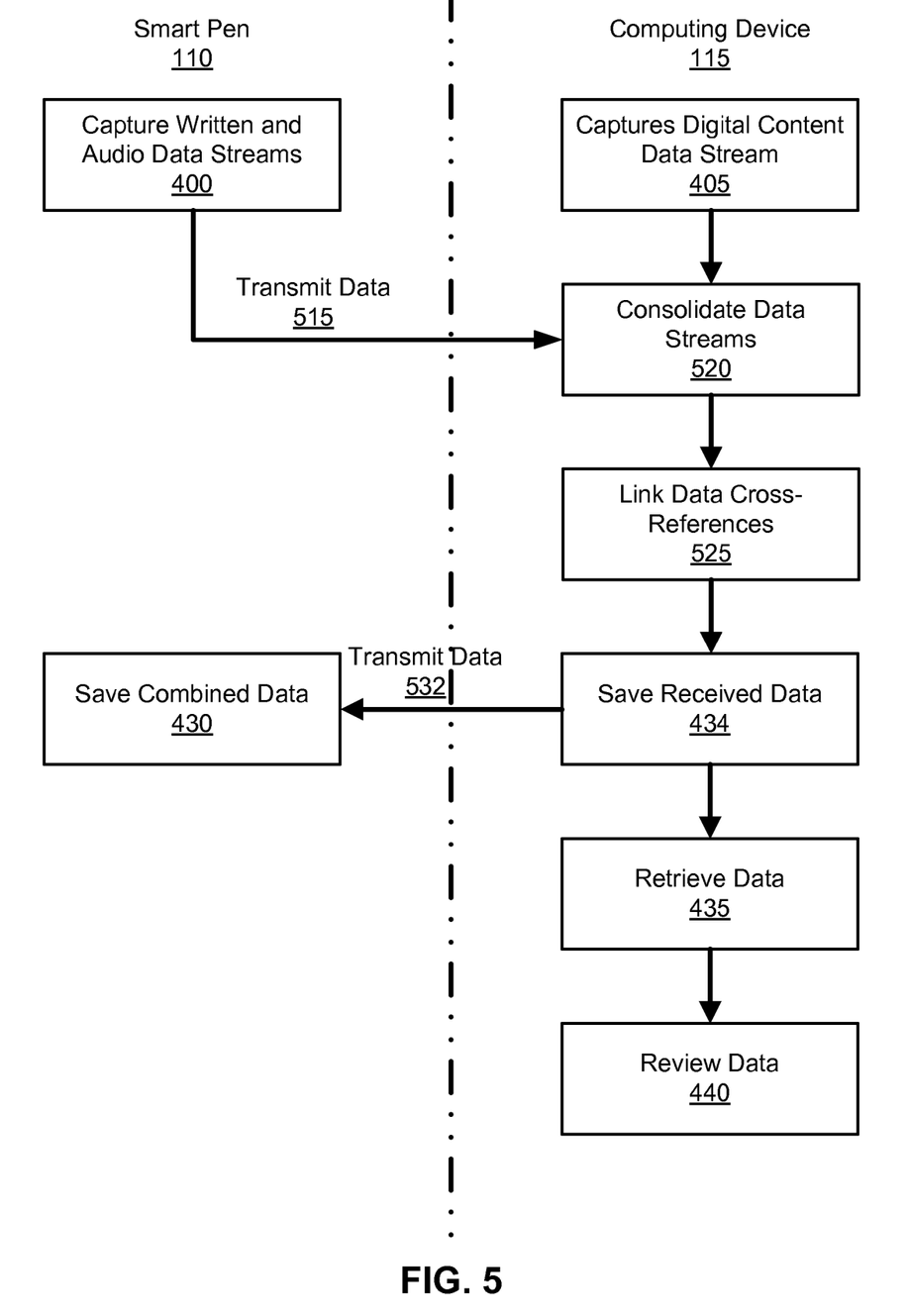
FIG. 5 is a flow diagram of an embodiment of a process for capturing and processing content by a smart pen and a computing device.

FIGS. 4 and 5 illustrate possible embodiments of a process for capturing and processing written, audio, and digital content by a smart pen 110 and a computing device 115 so that the data can be reviewed at a later time. Occasional transmissions of data 415/515 (usually over network 120) allow data collected by both the smart pen 110 and computing device 115 to be consolidated in one device for further data processing. FIG. 4 illustrates an example of a process in which data is consolidated and correlated in a smart pen 110 before being saved on both the smart pen 110 and a computing device 115. An alternative embodiment of the process is illustrated in FIG. 5, where data is consolidated and correlated in a computing device 115 before being saved on both the computing device 115 and a smart pen 110. The intention of collecting and processing the data is to allow the connection and correlation of multiple streams or collections of content such that different content collections can be found and retrieved based on the use of other linked content. For example, individual gestures are linked to specific pages based on the time that the gesture that was written and the page that was visible at the time. Once this relationship is established, gestures attached to a page can be easily retrieved when the linked page is viewed. Furthermore, tapping on gestures recorded in a notepad may also display the pages in digital content that were viewed at the time of writing. Any other attributes of the digital content pages may also be triggered (e.g., zooming into a particular portion of a page, having multiple different digital contents open, having content windows organized a certain way in a viewing area and so forth).

Referring first to the example in FIG. 4, the smart pen 110 captures 400 the written and audio data streams 300, 305 from user operations. The user's handwriting along with any other relevant pen movements are recorded as gestures in the written data stream 300 in the manner described above. Furthermore, microphones 220 capture audio from the user's surroundings and process it into an audio data stream 305. In addition, references to external digital contents displayed on a connected computing device 115 may also be captured and incorporated into these data streams. Concurrently, a computing device 115 connected to the smart pen 110 (either wirelessly or wired) captures 405 state changes of the computing device 115 (e.g., changing pages of a digital document) that are recorded in the digital content data stream 310.

In one embodiment, the computing device correlates these states changes to the time index 315 before transmitting 415 the captured state changes and timing information to the smart pen 110. Alternatively, the computing device 115 may transmit 415 data indicating the state changes to the smart pen 110 in real-time, and the smart pen 110 then correlates the timing of the received data to the time index 315.

The smart pen 110 can then consolidate 420 the one or more of the various data streams 300, 305, 310 for ease of data processing. This may involve matching corresponding time indices 315 so that relationships between the associated data streams are also formed. Data from different data streams may also be linked 425 to or recorded into other data streams even if there is no time correlation during the initial capture. For example, gestures may be manually linked to a portion of a digital document based on instructions from a user. In another example, audio data from a specific interval of time may be linked to corresponding selected region of the writing surface 105 or may be linked to a selected portion of a digital document. The data is then combined and saved 430 on the smart pen 110. The data may furthermore be transmitted 432 to the computing device 115 where it is saved 434 (e.g., as a metadata file linked to a digital document).

Upon a user's request for playback and review, the computing device 115 retrieves 435 the saved data and one or more of the component data feeds 300, 305, 310 can then be replayed in synchronization. For example, the written data feed 300 and audio data feed 305 may be replayed, for example, as a "movie" of the captured writing gestures on a display of the computing device 115 together with the audio data feed 305. Furthermore, the digital content data feed 310 may be replayed as a "movie" that transitions the computing device 115 between the sequence of previously recorded states according to the captured timing. In this way, the user can find and review audio being recorded, gestures that were captured, and pages that were viewed over the course of a particular time period.

In another embodiment, the user can then interact with the recorded data in a variety of different ways. For example, in one embodiment, the user can interact with (e.g., tap) a particular location on the writing surface 105 corresponding to previously captured writing, or the user can interact with a rendering of the captured gestures on the computing device 115. The spatial coordinates can then be estimated. The time location corresponding to when the writing at that particular location occurred can then be determined. Audio corresponding to the time location can then be re-played and the computing device 115 may be updated to display the portion of the digital document associated with the determined time location. Digital content that was open on a viewed computing device 115 may also be retrieved for viewing. Additional attributes of the digital content, such as what portion of a page was zoomed in on, how the content windows were arranged on a viewing screen and which other digital contents were open at the same time, may also be retrieved and reflected on the computing device 115 during review.

In one embodiment, multiple digital documents may be associated with one set of gesture data. Then, when a user selects (e.g. taps) written text, multiple documents are updated on the computing device 115 to show the state of those documents when the gestures were captured. For example, the user opens three digital documents on the computing device 115. The first is zoomed to a graph on page 2. The second is zoomed to a particularly interesting quote. The third displays a list of important references. The windows may be arranged as desired (overlapping or side-by-side) and then a label is written on the writing surface 105 (e.g., "presentation display") that becomes linked to the digital documents in their current presentation state. Later when the label is selected (e.g., by tapping the smart pen 110 on the written words "presentation display"), the associated pages of the digital documents are retrieved and displayed just as they were arranged. This embodiment is beneficial, for example, for organizing presentations or saving "work piles" that a user wants to revisit at future dates.

Alternatively, a time location can be identified by using a slider navigation tool on the computing device 115 while re-playing recorded audio. Gestures and digital content (e.g., a page of a digital document) can then be displayed that correspond to the time location.

In another example, the computing device 115 may be placed in a state that is unique to a particular time location in the digital content data feed 210 (e.g., by flipping to a page that is indexed to a particular time). The audio data feed 305, the digital content data feed 310, and or the written data feed may be re-played beginning at the identified time location. Digital document pages in digital content data feed 310 can also be flipped through in the same way as a printed book or stack of pages. The user can have any written gestures or recorded audio associated with a page retrieved while the page is visible. Gestures may be overlaid on the page or may be spatially interleaved in a visual sequence of pages. Additionally, the user may add to modify one or more of the data feeds 300, 305, 310 at an identified time location.

In an alternative embodiment, one or more of the steps illustrated in FIG. 4 as being performed by the smart pen 110 may instead be performed by the computing device 115 (or cloud server 125) or vice versa. For example, in the process illustrated in FIG. 5, the smart pen 110 captures 400 the written (and optionally audio) data streams as described above and the computing device 115 captured 405 the digital content stream. Data from the smart pen 110 is transmitted 515 to the computing device 115, where it is consolidated 520 and linked 525 with the other data streams 300, 305. The resulting combined data may be saved 435 in computing device 115 and transmitted 532 to the smart pen 110 to be saved 430. Data may then be retrieved 435 and reviewed 440 in the same manner described above.

In other alternative embodiments, one or more of the processing steps of FIG. 4 or 5 described above may be performed by the cloud server 125 instead of (or in addition to) being performed by the smart pen 110 or computing device 115.

Additional Embodiments

The foregoing description of the embodiments has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program instructions, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a processor, a first data stream representing gesture data captured by a gesture capture system of a smart pen device interacting with a writing surface;
receiving, by the processor, a second data stream representing a sequence of states associated with one or more applications executing on a computing device, each state identifying content being displayed by a computing device while the gesture capture system captures the gesture data;
indexing, by the processor, the first and second data streams to a synchronized time index; and
storing the indexed first and second data streams to a memory.

2. The computer-implemented method of claim 1, further comprising:
receiving, by the processor, a third data stream representing audio data captured by an audio capture system;
indexing, by the processor, the third data stream to the synchronized time index; and
storing the indexed third data stream to the memory.

3. The computer-implemented method of claim 1, wherein one state in the sequence of states comprises a particular page of a digital document displayed by the computing device at a given time.

4. The computer-implemented method of claim 1, wherein one state in the sequence of states comprises a particular zoomed in portion of a page of a digital document displayed by the computing device at a given time.

5. The computer-implemented method of claim 1, wherein one state in the sequence of states comprises one or more user inputs stored by the computing device at a given time.

6. The computer-implemented method of claim 1, wherein one state in the sequence of states comprises a playback frame of a video played by the computing device at a given time.

7. The computer-implemented method of claim 1, wherein the sequence of states comprises one or more state changes, and wherein the state changes are temporally correlated to the synchronized time index.

8. The computer-implemented method of claim 1, wherein the indexing comprises temporally synchronizing the first and second data streams based on the time the data streams were generated.

9. The computer-implemented method of claim 1, further comprising:
retrieving at least one of the stored indexed data streams upon a user's request for playback; and
replaying a portion of the retrieved data streams, wherein the replaying comprises displaying the gesture data or the sequence of states in correlation with the synchronized time index.

10. The computer-implemented method of claim 9, wherein the replaying further comprises:
identifying a portion of a previously captured gesture based on an interaction between the smart pen and the writing surface;
correlating the identified portion of the previously captured gesture to a particular time point in the time index; and
replaying the identified portion of the previously captured gesture beginning from the particular time point.

11. The computer-implemented method of claim 9, wherein the replaying further comprises:
identifying a portion of a previously captured state based on content displayed by the computing device;
correlating the identified portion of the previously captured state to a particular time point in the time index; and
replaying the identified portion of the previously captured state beginning from the particular time point.

12. The computer-implemented method of claim 1, further comprising:
identifying a portion of the first data stream;
receiving a request to associate the portion of the first data stream with a portion of a digital document; and
storing an association between the portion of the first data stream and the portion of the digital document.

13. The computer-implemented method of claim 12, further comprising:
identifying a portion of a third data stream representing audio data captured by an audio capture system;
receiving a request to associate the portion of the third data stream with a portion of a selected region of the writing surface; and
storing an association between the portion of the third data stream and the selected region of the writing surface.

14. A smart pen computing system comprising:
a non-transitory computer-readable storage medium storing computer program code and integrated within the smart pen device, the computer program code configured to be executed by the processor, the computer program code including instructions for:
receiving, by a processor, a first data stream representing gesture data captured by a gesture capture system of a smart pen device interacting with a writing surface;
receiving, by the processor, a second data stream representing a sequence of states associated with one or more applications executing on a computing device, each state identifying content being displayed by a computing device while the gesture capture system captures the gesture data;
indexing, by the processor, the first and second data streams to a synchronized time index; and
storing the indexed first and second data streams to a memory.

15. The smart pen computing system of claim 14, further comprising:
a smart pen, wherein the processor is integrated within the smart pen; and
a gesture capture system integrated within the smart pen, the gesture capture system coupled to the processor and the gesture capture system for capturing written data.

16. The smart pen computing system of claim 14, the computer program code including further instructions for:
receiving, by the processor, a third data stream representing audio data captured by an audio capture system;
indexing, by the processor, the third data stream to the synchronized time index; and
storing the indexed third data stream to the memory.

17. The smart pen computing system of claim 14, wherein one state in the sequence of states comprises a particular page of a digital document displayed by the computing device at a given time.

18. The smart pen computing system of claim 14, wherein one state in the sequence of states comprises one or more user inputs stored by the computing device at a given time.

19. The smart pen computing system of claim 14, wherein the indexing comprises temporally synchronizing the first and second data streams based on the time the data streams were generated.

20. The smart pen computing system of claim 14, the computer program code including further instructions for:
- retrieving at least one of the stored indexed data streams upon a user's request for playback; and
- replaying a portion of the retrieved data streams, wherein the replaying comprises displaying the gesture data or the sequence of states in correlation with the synchronized time index.

21. The smart pen computing system of claim 14, the computer program code including further instructions for:
- identifying a portion of the first data stream;
- receiving a request to associate the portion of the first data stream with a portion of a digital document; and
- storing an association between the portion of the first data stream and the portion of the digital document.

* * * * *